(12) United States Patent
Suzuki et al.

(10) Patent No.: US 9,707,959 B2
(45) Date of Patent: Jul. 18, 2017

(54) DRIVING ASSISTANCE APPARATUS

(71) Applicant: DENSO CORPORATION, Kariya, Aichi-pref. (JP)

(72) Inventors: Takamitsu Suzuki, Kariya (JP); Takahira Katoh, Kariya (JP); Takeshi Yamamoto, Kariya (JP); Yuuko Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/310,903

(22) PCT Filed: May 26, 2015

(86) PCT No.: PCT/JP2015/002660
§ 371 (c)(1),
(2) Date: Nov. 14, 2016

(87) PCT Pub. No.: WO2015/190051
PCT Pub. Date: Dec. 17, 2015

(65) Prior Publication Data
US 2017/0088130 A1    Mar. 30, 2017

(30) Foreign Application Priority Data

Jun. 10, 2014    (JP) ................................ 2014-119945

(51) Int. Cl.
*G08G 1/16* (2006.01)
*B60W 30/06* (2006.01)
(Continued)

(52) U.S. Cl.
CPC ............ *B60W 30/06* (2013.01); *B60R 11/04* (2013.01); *G08G 1/165* (2013.01); *G08G 1/168* (2013.01);
(Continued)

(58) Field of Classification Search
CPC ............ B60W 30/06; B60W 2550/10; B60W 2420/42; G08G 1/165; G08G 1/168; B60R 11/04; B62D 15/021
See application file for complete search history.

(56) References Cited

U.S. PATENT DOCUMENTS

| 2012/0133766 A1* | 5/2012 | Ge ..................... B62D 15/0295 348/148 |
| 2013/0242101 A1* | 9/2013 | Schneider .............. G08G 1/168 348/148 |
| 2016/0063861 A1* | 3/2016 | Lee .......................... G08G 1/14 340/932.2 |

FOREIGN PATENT DOCUMENTS

| JP | 2004106701 A | 4/2004 |
| JP | 2008207732 A | 9/2008 |

(Continued)

*Primary Examiner* — Richard Camby
(74) *Attorney, Agent, or Firm* — Harness, Dickey & Pierce, P.L.C.

(57) ABSTRACT

A driving assistance apparatus includes a proximity detection section that detects an obstacle within a set distance, a behavior regulation section that performs a forced braking of a vehicle when the obstacle is detected by the proximity detection section, an arrangement memory that stores a past captured image around a target parking region, a captured image acquisition section that acquires a present captured image around the target parking region at parking or departing with respect to the target parking region, and an obstacle specification section that specifies a non-stationary obstacle around the target parking region, based on a difference between the past captured image stored in the arrangement memory and the present captured image acquired by the arrangement acquisition section. The proximity detection section assigns a stationary object with the set distance that is smaller than the set distance assigned to a non-stationary object.

7 Claims, 12 Drawing Sheets

(51) Int. Cl.
*B60R 11/04* (2006.01)
*B62D 15/02* (2006.01)

(52) U.S. Cl.
CPC ..... *B60W 2420/42* (2013.01); *B60W 2550/10* (2013.01); *B62D 15/021* (2013.01)

(56) References Cited

FOREIGN PATENT DOCUMENTS

| | | | |
|---|---|---|---|
| JP | 2010117751 | A | 5/2010 |
| JP | 2011126337 | A | 6/2011 |
| JP | 2013246571 | A | 12/2013 |

* cited by examiner

FIG. 4

| PARKING REGION | PATTERNS | CAPTURE IMAGES |
|---|---|---|
| C | ENTERING FROM THE RIGHT WITH BACKWARD MOVEMENT | Pic1 |
| | ENTERING FROM THE LEFT WITH BACKWARD MOVEMENT | Pic2 |
| | ENTERING STRAIGHT WITH BACKWARD MOVEMENT | Pic3 |
| | ENTERING FROM THE RIGHT WITH FORWARD MOVEMENT | Pic4 |
| | ENTERING FROM THE LEFT WITH FORWARD MOVEMENT | Pic5 |
| | ENTERING STRAIGHT WITH FORWARD MOVEMENT | Pic6 |
| | EXITING TO THE RIGHT WITH BACKWARD MOVEMENT | Pic7 |
| | EXITING TO THE LEFT WITH BACKWARD MOVEMENT | Pic8 |
| | EXITING STRAIGHT WITH BACKWARD MOVEMENT | Pic9 |
| | EXITING TO THE RIGHT WITH FORWARD MOVEMENT | Pic10 |
| | EXITING TO THE LEFT WITH FORWARD MOVEMENT | Pic11 |
| | EXITING STRAIGHT WITH FORWARD MOVEMENT | Pic12 |

FIG. 7
NON-STATIONARY OBJECT
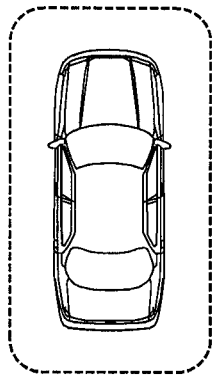
STATIONARY OBJECT
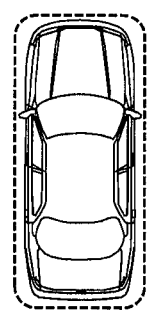

FIG. 12A

| DRIVERS | PARKING REGION | PATTERNS | CAPTURE IMAGES |
|---|---|---|---|
| X | C1 | ENTERING FROM THE RIGHT WITH BACKWARD MOVEMENT | Pic1 |
| | | ENTERING FROM THE LEFT WITH BACKWARD MOVEMENT | Pic2 |
| | | ENTERING STRAIGHT WITH BACKWARD MOVEMENT | Pic3 |
| | | ENTERING FROM THE RIGHT WITH FORWARD MOVEMENT | Pic4 |
| | | ENTERING FROM THE LEFT WITH FORWARD MOVEMENT | Pic5 |
| | | ENTERING STRAIGHT WITH FORWARD MOVEMENT | Pic6 |
| | | EXITING TO THE RIGHT WITH BACKWARD MOVEMENT | Pic7 |
| | | EXITING TO THE LEFT WITH BACKWARD MOVEMENT | Pic8 |
| | | EXITING STRAIGHT WITH BACKWARD MOVEMENT | Pic9 |
| | | EXITING TO THE RIGHT WITH FORWARD MOVEMENT | Pic10 |
| | | EXITING TO THE LEFT WITH FORWARD MOVEMENT | Pic11 |
| | | EXITING STRAIGHT WITH FORWARD MOVEMENT | Pic12 |

FIG. 12B

| | | | |
|---|---|---|---|
| Y | C1 | ENTERING FROM THE RIGHT WITH BACKWARD MOVEMENT | Pic13 |
| | | ENTERING FROM THE LEFT WITH BACKWARD MOVEMENT | Pic14 |
| | | ENTERING STRAIGHT WITH BACKWARD MOVEMENT | Pic15 |
| | | ENTERING FROM THE RIGHT WITH FORWARD MOVEMENT | Pic16 |
| | | ENTERING FROM THE LEFT WITH FORWARD MOVEMENT | Pic17 |
| | | ENTERING STRAIGHT WITH FORWARD MOVEMENT | Pic18 |
| | | EXITING TO THE RIGHT WITH BACKWARD MOVEMENT | Pic19 |
| | | EXITING TO THE LEFT WITH BACKWARD MOVEMENT | Pic20 |
| | | EXITING STRAIGHT WITH BACKWARD MOVEMENT | Pic21 |
| | | EXITING TO THE RIGHT WITH FORWARD MOVEMENT | Pic22 |
| | | EXITING TO THE LEFT WITH FORWARD MOVEMENT | Pic23 |
| | | EXITING STRAIGHT WITH FORWARD MOVEMENT | Pic24 |
| | C2 | ENTERING FROM THE RIGHT WITH BACKWARD MOVEMENT | Pic25 |
| | | ENTERING FROM THE LEFT WITH BACKWARD MOVEMENT | Pic26 |
| | | ENTERING STRAIGHT WITH BACKWARD MOVEMENT | Pic27 |
| | | ENTERING FROM THE RIGHT WITH FORWARD MOVEMENT | Pic28 |
| | | ENTERING FROM THE LEFT WITH FORWARD MOVEMENT | Pic29 |
| | | ENTERING STRAIGHT WITH FORWARD MOVEMENT | Pic30 |
| | | EXITING TO THE RIGHT WITH BACKWARD MOVEMENT | Pic31 |
| | | EXITING TO THE LEFT WITH BACKWARD MOVEMENT | Pic32 |
| | | EXITING STRAIGHT WITH BACKWARD MOVEMENT | Pic33 |
| | | EXITING TO THE RIGHT WITH FORWARD MOVEMENT | Pic34 |
| | | EXITING TO THE LEFT WITH FORWARD MOVEMENT | Pic35 |
| | | EXITING STRAIGHT WITH FORWARD MOVEMENT | Pic36 |

DRIVING ASSISTANCE APPARATUS

CROSS REFERENCE TO RELATED APPLICATIONS

This application is a U.S. National Phase Application under 35 U.S.C. 371 of International Application No. PCT/JP2015/002660 filed on May 26, 2015 and published in Japanese as WO 2015/190051 A1 on Dec. 17, 2015. This application is based on and claims the benefit of priority from Japanese Patent Application No. 2014-119945 filed on Jun. 10, 2014. The entire disclosures of all of the above applications are incorporated herein by reference.

TECHNICAL FIELD

The present disclosure relates to a driving assistance apparatus which controls a vehicle according to presence of an obstacle.

BACKGROUND ART

There is conventionally known a technology that detects an obstacle using such obstacle sensors as a camera or sonar provided in a vehicle and controls the vehicle according to the presence of the obstacle.

For example, Patent literature 1 discloses a driving assistance apparatus that detects an obstacle within a detection distance based on output signals of clearance sonars installed in a front portion and rear portion of the vehicle and sounds a buzzer alarm to output a buzzer sound according to the detection distance.

In addition, Patent literature 2 discloses an obstacle determination apparatus that drives a brake actuator of a vehicle to perform forced braking when the distance to the obstacle measured by a radar transitions from above a predetermined value into below the predetermined value under the situation where the vehicle moves from the stopping state to the departing state.

PRIOR ART LITERATURES

Patent Literature

Patent literature 1: JP 2011-126337 A
Patent literature 2: JP 2004-106701 A

SUMMARY OF INVENTION

The driving assistance apparatus in Patent literature 1 however involves the following issue. Suppose that a stationary obstacle (hereinafter, a stationary object) such as a wall is existing around a parking region at home, e.g., so that the host vehicle needs to always approach closely the stationary object on each parking or departing. In such cases, the stationary object is always located within the detection distance on each parking or departing, generating the buzzer sound. The driver of the vehicle may be accustomed to parking or departing in the parking region and able to perform each parking or departing without no contact with such a stationary obstacle. Even in such cases, the buzzer sound is generated against the stationary object on each parking or departing, causing the driver to feel troublesome.

In addition, Patent literature 2 discloses a technology that performs forced braking on each departing from a parking region at home, e.g., if a stationary object such as wall is existing in front of the parking region and the vehicle needs to always approach closely the stationary object. Even if the driver is accustomed to departing from the parking region and able to perform each departing without no contact with the stationary obstacle, the forced braking is generated to thereby cause the driver to feel troublesome.

It is an object of the present disclosure to provide a driving assistance apparatus that performs a report or an automatic behavior control of a vehicle depending on presence of an obstacle to help prevent a driver from feeling troublesome even when the vehicle needs to always approach closely a stationary obstacle that is existing around a parking region on each parking or departing.

According to an example of the present disclosure, a driving assistance apparatus used in a vehicle is provided to include a control target detection, an obstacle handling section, an arrangement memory, an arrangement acquisition section, and an obstacle specification section. The control target detection section detects as a target obstacle an obstacle that is existing within a set distance from the vehicle using an obstacle sensor detecting an obstacle around the vehicle. The obstacle handling section performs at least either a report or an automatic behavior control of the vehicle when the control target detection section detects the target obstacle. The arrangement memory stores a past obstacle arrangement around a parking region that serves as a target. The arrangement acquisition section acquires a present obstacle arrangement around the parking region in a parking-region driving operation. The parking-region driving operation is at least either a driving operation to cause the vehicle to enter into the parking region or a driving operation to cause the vehicle to exit from the parking region. The obstacle specification section specifies a non-stationary obstacle that is an obstacle being not stationary around the parking region, based on a difference between the past obstacle arrangement stored in the arrangement memory and the present obstacle arrangement acquired by the arrangement acquisition section. The control target detection section detects the target obstacle by setting the set distance in cases that the obstacle specification section fails to specify a non-stationary obstacle to be smaller than the set distance in cases that the obstacle specification section specifies a non-stationary obstacle.

If only a stationary obstacle is existing around a parking region that is a target, any difference is not found in between the past obstacle arrangement and the present obstacle arrangement around the parking region. In contrast, if a non-stationary obstacle is existing, a difference is found in between the past obstacle arrangement and the present obstacle arrangement around the parking region. The difference between the past obstacle arrangement stored in the arrangement memory and the present obstacle arrangement acquired by the arrangement acquisition section allows the obstacle specification section to specify a non-stationary obstacle that is an obstacle not stationary around the parking region.

In addition, the control target detection section sets the set distance in cases that any non-stationary obstacle is not specified to be smaller than the set distance in cases that a non-stationary obstacle is specified. Even if a stationary obstacle, which the vehicle needs to always approach closely on each parking or departing, is existing around the parking region, the distance for detecting such a stationary obstacle as a target obstacle can be shortened. Shortening the distance for detecting an obstacle as a target obstacle permits the obstacle to be detected as the target obstacle only when the vehicle approaches the obstacle more closely. Even if the vehicle needs to always approach closely a stationary obstacle on each parking or departing, any report or automatic behavior control of the vehicle can be prevented from working against the stationary obstacle.

Thus, even if there is existing around a parking region a stationary obstacle the vehicle needs to always approach closely on each parking or departing, the driving assistance apparatus performs a report or an automatic behavior control of the vehicle depending on presence of the stationary obstacle, helping prevent the driver from feeling troublesome.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram illustrating an example of a correspondence relation between captured images and patterns of vehicle's parking or departing directions against a target parking region;

FIG. 7 is a diagram schematically illustrating examples of a detection range detecting a stationary object as a target obstacle using a stationary object set distance and a detection range detecting a non-stationary object as a target obstacle using a non-stationary object set distance;

FIG. 12A is a diagram illustrating an example of a correspondence relation between captured images and patterns of vehicle's parking or departing directions depending on drivers and target parking regions according to the second modification example;

FIG. 12B is a diagram illustrating an example of a correspondence relation between captured images and patterns of vehicle's parking or departing directions depending on drivers and target parking regions according to the second modification example.

EMBODIMENTS FOR CARRYING OUT INVENTION

First Embodiment

<Schematic Configuration of Driving Assistance System 100>

Figure 1:
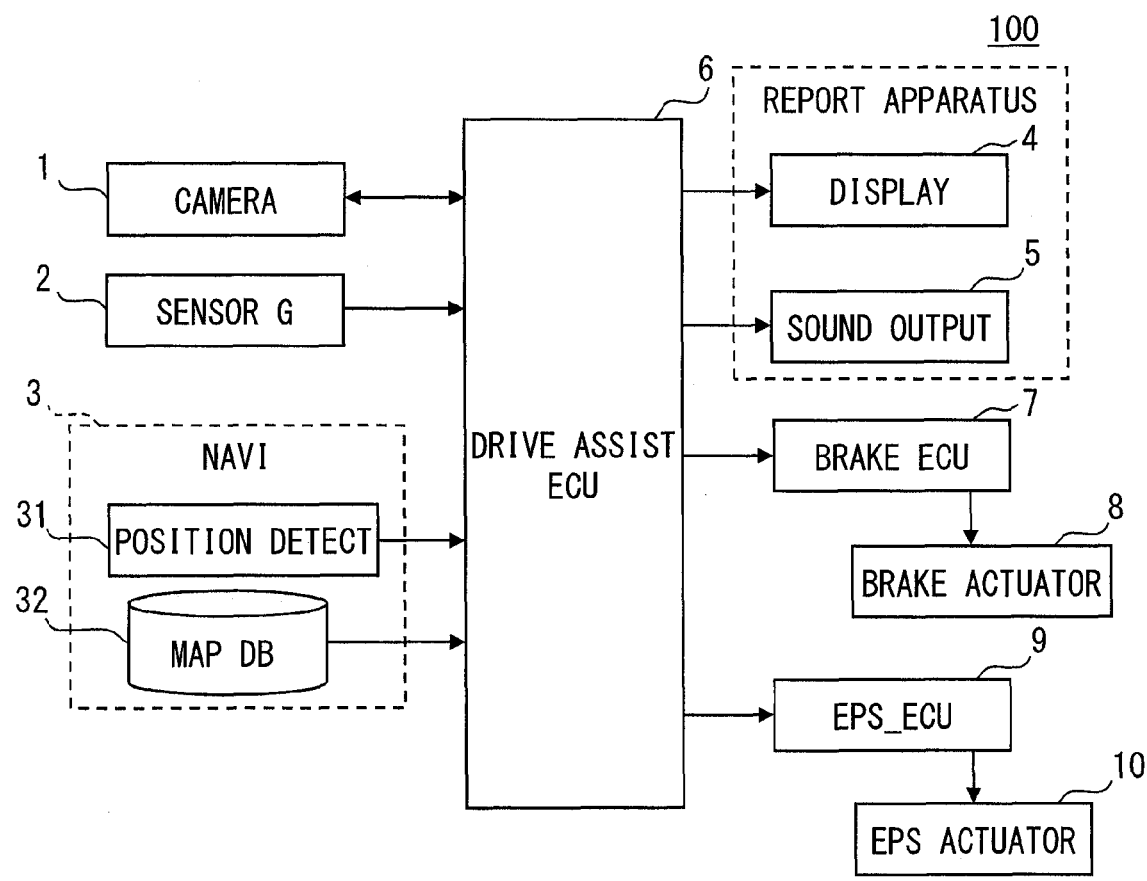
FIG. 1 is a block diagram illustrating an example of a schematic configuration of a driving assistance system.

FIG. 1 is a diagram illustrating an example of a schematic configuration of a driving assistance system 100 which the present disclosure is applied to. The driving assistance system 100, which is mounted in a vehicle, includes a camera 1, a vehicle state sensor group 2, a navigation apparatus 3, a display apparatus 4, a sound output apparatus 5, a driving assistance ECU 6, a brake ECU 7, a brake actuator 8, an EPS_ECU 9, and an EPS actuator 10, as illustrated in FIG. 1. Hereinafter, the vehicle mounted with the driving assistance system 100 may be also referred to as a host vehicle or a subject vehicle.

The camera 1, which is installed in the vehicle, captures an image of a vehicle's peripheral area surrounding the vehicle. The camera 1 may be also referred to as an obstacle sensor or an imaging apparatus. The camera 1 in the present embodiment is explained as an example using a front camera and a rear camera. The front camera captures an image of an area in front of the vehicle with a predetermined view angle containing a corner portion in a front portion of the vehicle. The rear camera captures an image of an area behind the vehicle with a predetermined view angle containing a corner portion in a rear portion of the vehicle. The camera 1 will be explained as a stereo camera as an example of the present embodiment.

The vehicle state sensor group 2 is a various sensor group that detect vehicle states of the vehicle. The vehicle state sensor group 2 includes a vehicle velocity sensor that detects a velocity of the vehicle; a shift position sensor that detects a shift position of the vehicle; and a steer angle sensor that detects a steer angle of the vehicle.

The navigation apparatus 3 includes a position detection unit 31 and a map DB (database) 32. The position detection unit 31 detects a present position of the vehicle consecutively, for example, using a positioning system which detects the present position of the vehicle based on electric waves from positioning satellites. The present position of the vehicle is a position of a rear wheel axle of the vehicle indicated by coordinates of latitude and longitude, for instance. The map DB 32 stores map data containing road data including node data and link data. Nodes each correspond to an on-road point such as an intersection, branching point, or joining point that divides each road on an electronic map; links each connect nodes.

The display apparatus 4 displays texts and images according to instructions by the driving assistance ECU 6. The display apparatus 4, which can display full colors, includes a liquid crystal display. The display apparatus 4 may include a display provided in an instrument panel or a HUD (head-up display). The sound output apparatus 5 includes a speaker and outputs speeches according to instructions by the driving assistance ECU 6. The display apparatus 4 or the sound output apparatus 5 may be also referred to as a report apparatus.

The brake ECU 7 decelerates the vehicle by controlling the brake actuator 8 which applies braking force to the vehicle. The EPS_ECU 9 controls a steer angle by operating the EPS actuator 10.

The driving assistance ECU 6 mainly includes a microcomputer containing a known CPU, memories such as ROM or RAM, I/O, and a bus connecting the foregoing components. The driving assistance ECU 6 executes various processing based on a variety of information inputted from the camera 1, the vehicle state sensor group 2, and the navigation apparatus 3. The driving assistance ECU 6 may be also referred to as a driving assistance apparatus.

All or part of the functions executed by the driving assistance ECU 6 may be configured as hardware components such as one or more ICs.

<Detailed Configuration of Driving Assistance ECU 6>

Figure 2:
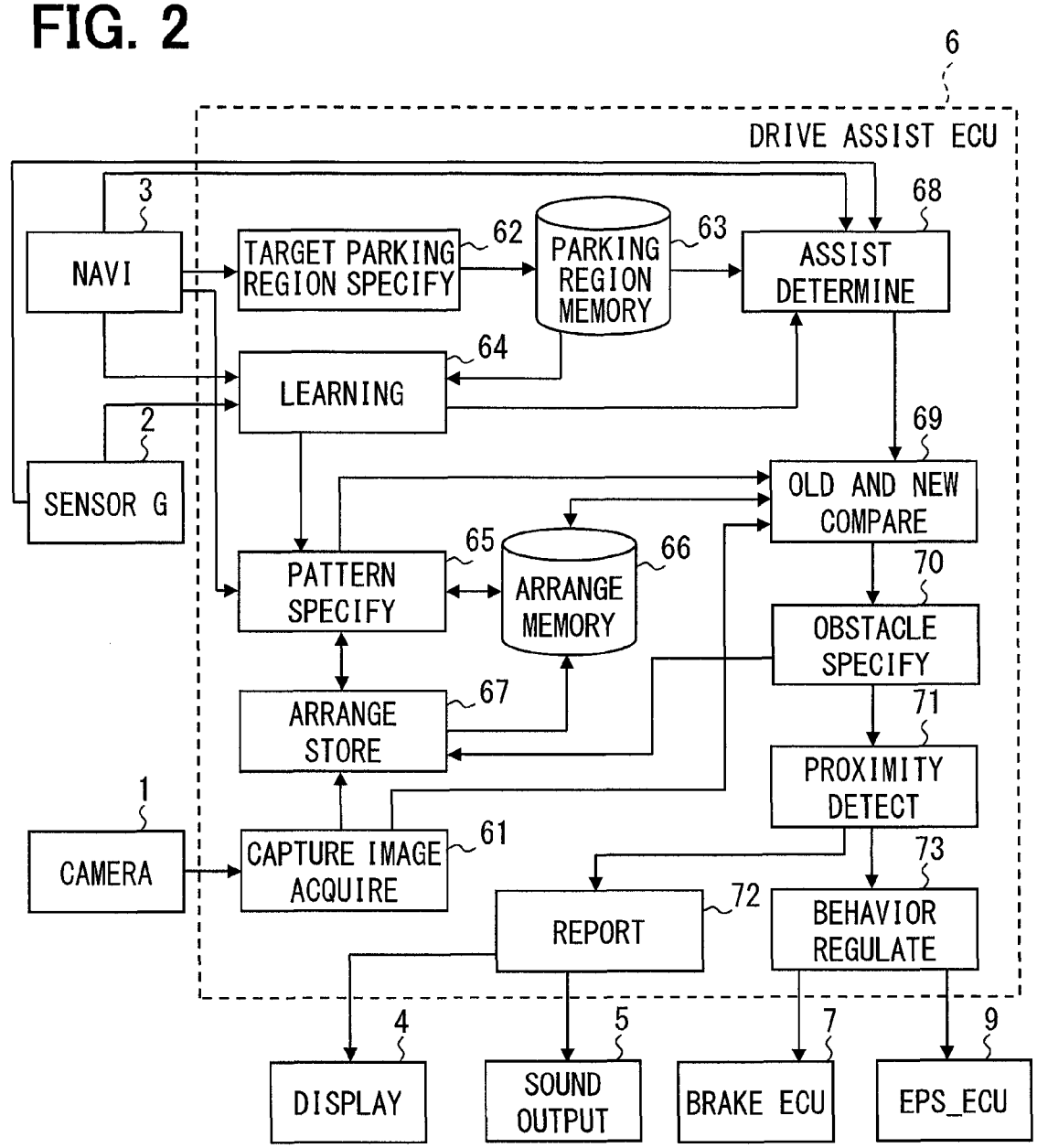
FIG. 2 is a block diagram illustrating an example of a schematic configuration of a driving assistance ECU.

As in FIG. 2, the driving assistance ECU 6 includes a captured image acquisition section 61, a target parking region specification section 62, a parking region memory 63 (which may be also referred to as a parking region storage portion), a learning determination section 64, a pattern specification section 65, an arrangement memory 66 (which may be also referred to as an arrangement storage portion), an arrangement storage section 67 (which may be also referred to as an arrangement storage processing section), an assistance determination section 68, an old and new comparison section 69, an obstacle specification section 70, a proximity detection section 71 (which may be referred to as a detection section), a report section 72 (which may be referred to as a report processing section), and a behavior regulation section 73 (which may be also referred to as a behavior control section).

The captured image acquisition section 61 acquires a captured image that is captured by the camera 1 successively. The target parking region specification section 62 specifies a parking region (hereinafter, a target parking region), which serves as a target for providing assistance at time of parking or departing, and stores the position of the specified target parking region in the parking region memory 63. The position of the target parking region is indicated with the coordinates of latitude and longitude, for example.

One example of the target parking region may be a position registered in the navigation apparatus 3 as user's home. Further, another example of the target parking region may be a vehicle position when a user manipulates a switch such as a button (unshown) for designating the target parking region. Yet further, another example of the target parking region may be a position where the vehicle is parked three times or more. The vehicle's parking (i.e., parking the vehicle) may be determined by the driving assistance ECU 6 based on that the vehicle state sensor group 2 detects that the shift position has moved to the parking position.

The parking region specification section 62 may specify several target parking regions like a parking region at home and a parking region at office. In such cases, the parking region memory 63 stores several positions of the respective target parking regions.

The learning determination section 64, the pattern specification section 65, the arrangement memory 66, the arrangement storage section 67, the assistance determination section 68, the old and new comparison section 69, the obstacle specification section 70, the proximity detection section 71, the report section 72, and the behavior regulation section 73 will be explained later in detail.

<Obstacle Learning Process in First Embodiment>

Figure 3:
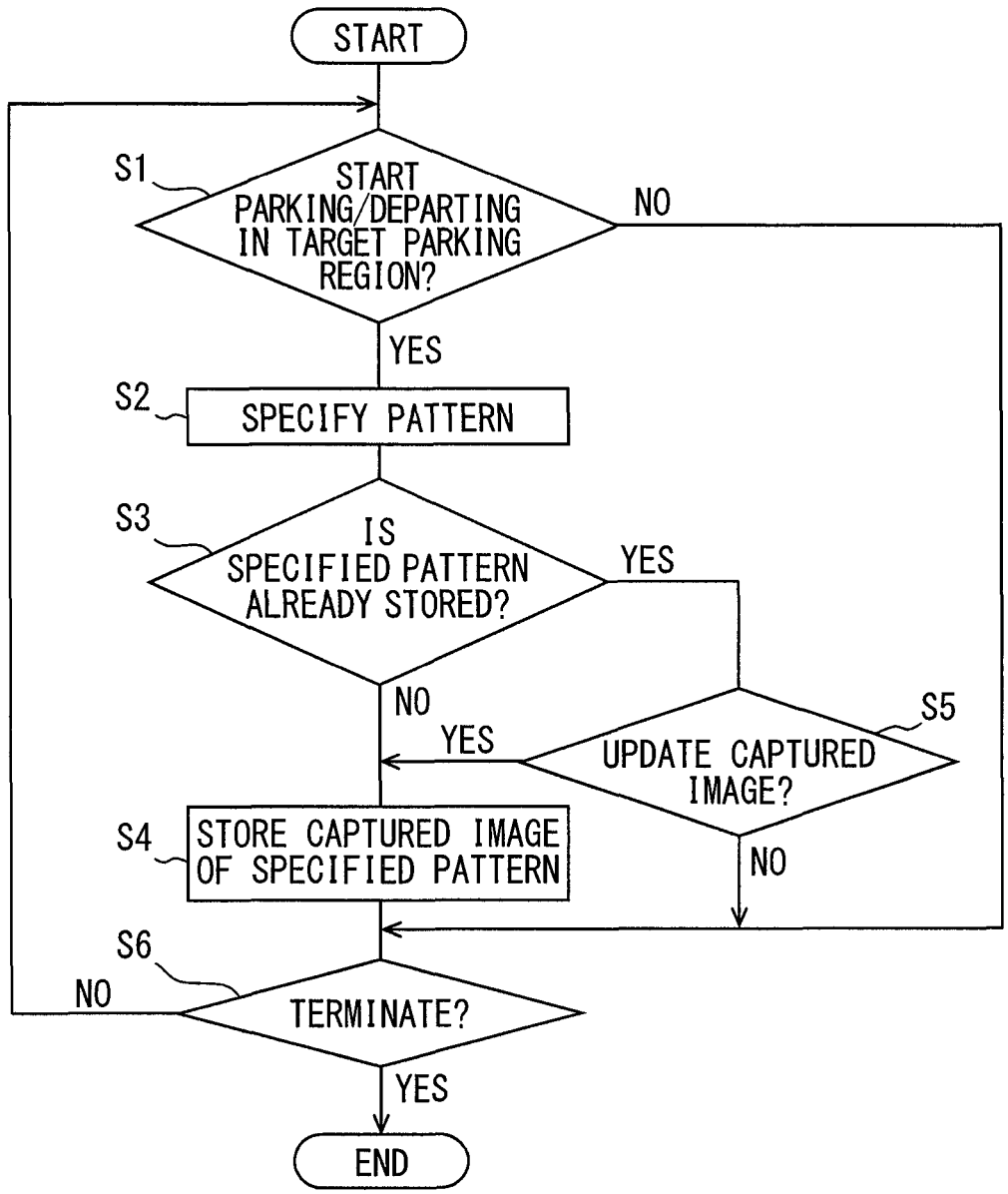
FIG. 3 is a flowchart illustrating an example of a sequence of an obstacle learning process in the driving assistance ECU.

The following explains an obstacle learning process by the driving assistance ECU 6 with reference to the flowchart in FIG. 3. The obstacle learning process is to store an obstacle arrangement that is an arrangement of obstacle(s) around a target parking region. The flowchart in FIG. 3 is started when the ignition power source of the vehicle is turned into ON state.

It is further noted that a flowchart or processing of the process in the present disclosure includes sections (also referred to as steps), which are represented, for instance, as S1. Further, each section can be divided into several sections while several sections can be combined into a single section. Furthermore, each section can be referred to as a device or module. Further, each section or combined sections can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, at S1, the learning determination section 64 determines whether the vehicle starts either a driving operation to cause the vehicle to enter the target parking region or a driving operation to cause the vehicle to exit from the target parking region (hereinafter, parking or departing). For instance, that the vehicle starts parking to the target parking region may be determined when the followings are simultaneously satisfied: the distance between the present position of the vehicle and the position of the target parking region stored in the parking region memory 63 being less than a predetermined distance such as 15 m, for example; the shift position of the vehicle detected by the vehicle state sensor group 2 being not the parking position; and the vehicle speed detected by the vehicle state sensor group 2 being equal to or less than a vehicle speed going slowly, for instance. Further, that the vehicle starts departing from the target parking region may be determined when the followings are simultaneously satisfied: the distance between the present position of the vehicle and the position of the target parking region being less than the predetermined distance; and the shift position of the vehicle detected by the vehicle state sensor group 2 being moved from the parking position to the forward moving position or the backward movement position.

In addition, another condition may be added such as the steer angle of the vehicle detected by the vehicle state sensor group 2 varying by a predetermined value or more.

When starting of the parking or departing is determined (S1: YES), the processing moves to S2. When starting of the parking or departing is not determined (S1: NO), the processing moves to S6.

At S2, the pattern specification section 65 specifies a pattern according to a state of the vehicle. The following explains the cases of specifying the patterns of parking or departing directions of the vehicle with respect to the target parking region, as an example of the present embodiment. The patterns of the parking or departing directions of the vehicle with respect to the target parking region may be specified from the present position of the vehicle, the heading direction of the vehicle using the present position of the vehicle obtained successively, the link data, and the target parking region.

The patterns of parking or departing directions of the vehicle with respect to the target parking region include twelve patterns as in FIG. 4, as follows: "entering from the right with backward movement," "entering from the left with backward movement," "entering straight with backward movement," "entering from the right with forward movement," "entering from the left with forward movement," "entering straight with forward movement," "exiting to the right with backward movement," "exiting to the left with backward movement," "exiting straight with backward movement," "exiting to the right with forward movement," "exiting to the left with forward movement," and "exiting straight with forward movement." FIG. 4 is a diagram illustrating an example of a correspondence relation between captured images and patterns of vehicle's parking or departing directions with respect to a target parking region. The correspondence relation is stored in the arrangement memory 66 with respect to each target parking region. FIG. 4 illustrates the correspondence relation between captured images and patterns of vehicle's parking or departing directions with respect to the target parking region C.

At S3, the arrangement storage section 67 determines whether a captured image about the pattern specified at S2 is previously stored in the arrangement memory 66. Suppose that the past obstacle learning process stored the captured image about the corresponding pattern. In such a case, the captured image about the pattern specified at S2 is previously stored in the arrangement memory 66. In contrast, suppose that the obstacle learning process is performed for the first time so that any captured image about the corresponding pattern is not stored. In such a case, the captured image about the pattern specified at S2 is not previously stored in the arrangement memory 66.

When it is determined that the captured image is not stored (S3: NO), the processing moves to S4. At S4, the captured image acquisition section 61 acquires a captured image. The acquired captured image is then stored by the arrangement storage section 67 in the arrangement memory 66 to be associated with the pattern specified at S2 (see FIG. 4), terminating the obstacle learning process. The captured image acquired by the captured image acquisition section 61 is acquired by the camera 1 capturing an image of an area in the heading direction of the vehicle. That is, the front camera acquires the captured image in forward movement; the rear camera acquires the captured image in backward movement.

Here, the associated patterns of "entering from the right with backward movement" and "entering from the right with forward movement" provide respective captured images similar to each other. Similarly, the associated patterns of "entering from the left with backward movement" and "entering from the left with forward movement" provide respective captured images similar to each other. The associated patterns of "entering straight with backward movement" and "entering straight with forward movement" provide respective captured images similar to each other. The associated patterns of "exiting to the right with backward movement" and "exiting to the right with forward movement" provide respective captured images similar to each other. The associated patterns of "exiting to the left with backward movement" and "exiting to the left with forward movement" provide respective captured images similar to each other. The associated patterns of "exiting straight with backward movement" and "exiting straight with forward movement" provide respective captured images similar to each other. When a subject captured image is acquired for one pattern of the associated patterns, the subject captured image may be stored also for the other pattern of the associated patterns.

When it is determined that the captured image is already stored (S3: YES), the processing moves to S5. At S5, the arrangement storage section 67 determines whether the captured image stored in the pattern specified at S2 needs to be updated. For instance, the captured image needs to be updated when any non-stationary object that is not stationary is not specified from the captured image acquired by the captured image acquisition section 61 at S27 of the parking or departing assistance process executed in parallel with the obstacle learning process, for instance. The parking or departing assistance process will be explained later.

When it is determined that the captured image needs to be updated (S5: YES), the processing moves to S4. At S4, the captured image acquired by the captured image acquisition section 61 is written over the arrangement memory 66 by the arrangement storage section 67 to be associated with the pattern specified at S2, thereby performing the update of the captured image. In contrast, when it is not determined that the captured image needs to be updated (S5: NO), the processing moves to S6.

The above explains the configuration that determines whether the captured image needs to be updated; however, another configuration may be provided which always updates the captured image without determining whether to need to be updated.

At S6, when it is determined that the time for terminating the obstacle learning process comes (S6: YES), the obstacle learning process is terminated. In addition, when it is not determined that the time for terminating the obstacle learning process comes (S6: NO), the processing returns to S1 to repeat the process. An example of the time for terminating the obstacle learning process may be the time when the distance between the present position of the vehicle and the position of the target parking region stored in the parking region memory 63 being equal to or greater than the predetermined distance, or the time when the ignition power source of the vehicle is turned into OFF state.

<Parking or Departing Assistance Process in First Embodiment>

Figure 5:
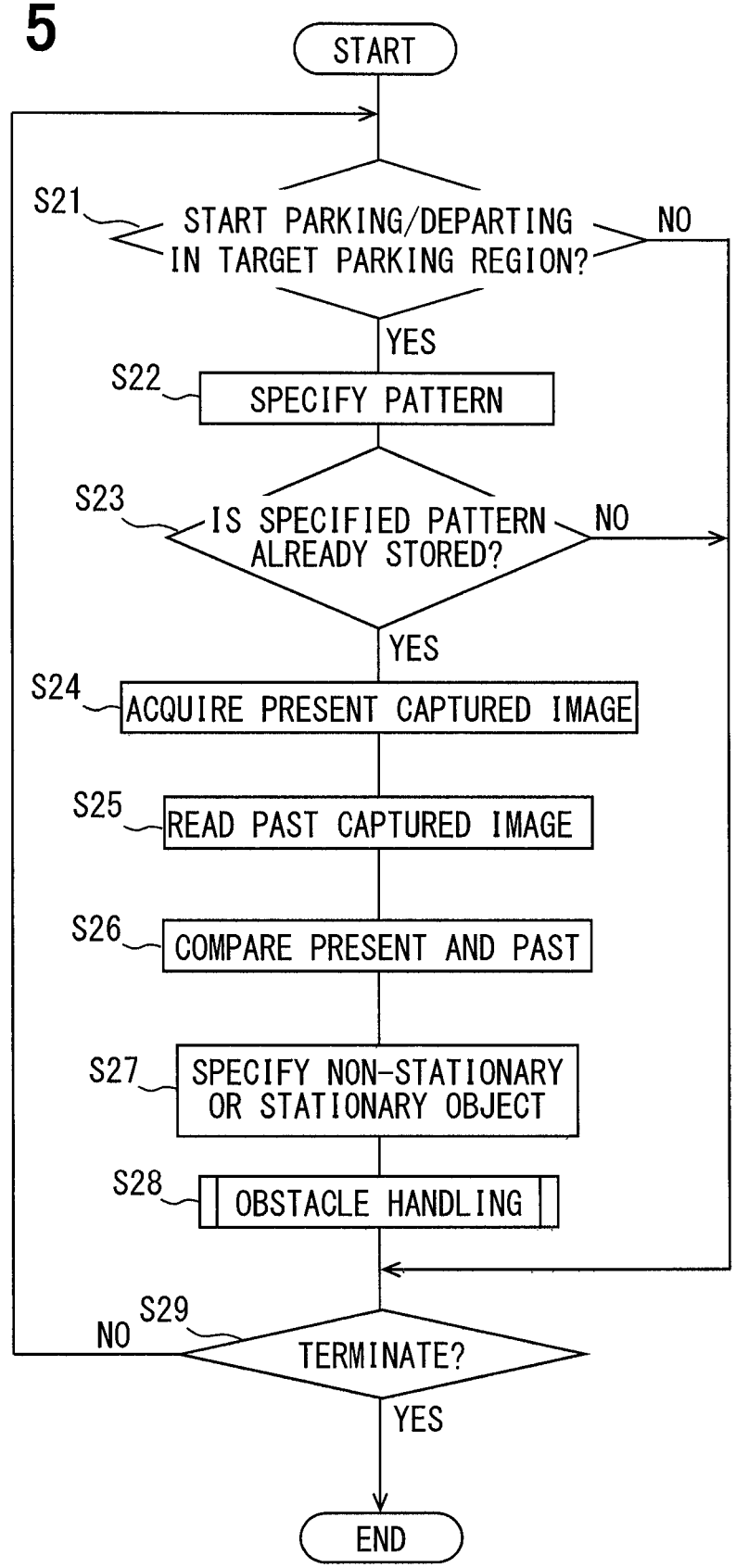
FIG. 5 is a flowchart illustrating an example of a sequence of a parking or departing assistance process in the driving assistance ECU.

The following explains a parking or departing assistance process by the driving assistance ECU 6 with reference to the flowchart in FIG. 5. The parking or departing assistance process performs a report or a vehicle behavior control according to an obstacle closely approaching the vehicle at the time of parking or departing with respect to the target parking region. The flowchart in FIG. 5 is started when the ignition power source of the vehicle is turned into ON state, and is executed in parallel with the above-mentioned obstacle learning process.

First, at S21, similarly to S1, the assistance determination section 68 determines whether the vehicle starts either a driving operation to cause the vehicle to enter the target parking region or a driving operation to cause the vehicle to exit from the target parking region (i.e., parking or departing). When starting of the parking or departing is determined (S21: YES), the processing moves to S22. When starting of the parking or departing is not determined (S21: NO), the processing moves to S29.

At S22, similarly to S2, the pattern specification section 65 specifies a pattern according to the state of the vehicle. An example of the present embodiment specifies the pattern of parking or departing direction of the vehicle with respect to the target parking region.

Here, the processing at S21-S22 may use S1-S2 in the obstacle learning process executed in parallel with the parking or departing assistance process. In such cases, one of the learning determination section 64 and the assistance determination section 68 may be provided with the function of the other one of the learning determination section 64 and the assistance determination section 68.

At S23, the arrangement storage section 67 determines whether the captured image is stored in the arrangement memory 66 with respect to the combination of the pattern specified at S22 and the target parking region of which parking or departing is determined at S21. In detail, when the captured image of the corresponding pattern is stored by the past obstacle learning process, it is determined that the captured image is stored in the arrangement memory 66. When the captured image of the corresponding pattern is not stored, it is not determined that the captured image is stored in the arrangement memory 66. When it is determined that the captured image is stored (S23: YES), the processing moves to S24. When it is determined that the captured image is not stored (S23: NO), the processing moves to S29.

At S24, the captured image acquisition section 61 acquires the present captured image. Therefore, the captured image acquisition section 61 may be also referred to as an arrangement acquisition section. At S25, the past captured image stored to be associated with the pattern specified at S22 is read out from the arrangement memory 66. The present captured image acquired at S24 and the past captured image read from the arrangement memory 66 at S25 have respective patterns identical to each other in respect of parking or departing direction with respect to the target parking region at the time of capturing.

In addition, even when a captured image is stored in the arrangement memory 66 at S4 of the obstacle learning process currently executed in parallel with the parking or departing assistance process, storing the captured image is performed based on the result of the processing at S27 after S25. Thus, S25 reads the captured image stored in the arrangement memory 66 by the past obstacle learning process earlier than the obstacle learning process currently executed in parallel with the parking or departing assistance process.

At S26, the old and new comparison section 69 compares the present captured image acquired at S24 with the past captured image read from the arrangement memory 66 at S25, and detects a difference in the captured images. Such difference in the captured images may be detected by subtracting the past captured image from the present captured image, similar to a known temporal difference imaging method, for example. Further, the difference may be detected as being greater than the error level.

The above error level may desirably include an error equivalent to a travel-tracks difference, which arises between the past captured image and the present captured image due to the deviation between the past and present travel tracks even if the same pattern of parking or departing direction of the vehicle is used. Such configuration can prevent the travel-tracks difference from being mistaken for the difference between the past captured image and the present captured image, thereby improving the accuracy for specifying a non-stationary object mentioned later.

(i) The present captured image acquired at S24 and (ii) the past captured image read from the arrangement memory 66 at S25 are identical to each other in the pattern of parking or departing with respect to the target parking region at the capturing time, each having almost identical capturing direction and capturing position. The arrangement of a stationary obstacle thus becomes identical in each of the past captured image and the present captured image. Subtracting the past captured image from the present captured image thus leads to an easy detection of the difference in the captured images.

Further, the capturing direction or the capturing position may be deviated between the past captured image and the present captured image. To consider such deviation, the influence due to the deviation may be desirably removed before subtracting the past captured image from the present captured image. For instance, several common characteristic points may be detected in between the present captured image and the past captured image; the captured images may be subjected to such modifications as enlargement, reduction, or rotation so that the positions of the several characteristic points overlap. This can remove the influence due to the deviation of the capturing direction or capturing position.

At S27, the obstacle specification section 70 specifies an obstacle that is not stationary (i.e., non-stationary object, non-stationary obstacle, or transitory obstacle) and an obstacle that is stationary (i.e., stationary object, stationary obstacle, or a non-transitory obstacle) around the target parking region based on the difference detected at S26.

One example uses a source image and a distance distribution (i.e., distance image) to detect several obstacles such as three-dimensional object, wall, bicycle, pedestrian in the captured image using a known image-recognition process and also detect the distances between the vehicle and the obstacles. The distance image is acquired from the azimuth difference of the present captured image of the stereo camera with a well-known stereo image process. Of the detected obstacles, an object existing in a position of the difference detected at S26 is specified as a non-stationary object; an object existing at a position other than the position of the difference detected at S26 is specified as a stationary object.

In addition, the obstacle specification section 70 detects successively distances between the vehicle and the stationary objects or non-stationary objects based on the distance image obtained from the captured images successively captured by the captured image acquisition section 61. Once specifying a stationary object or non-stationary object, the obstacle specification section 70 may detect successively the distance between the vehicle and the stationary object or non-stationary object by tracing the position of the stationary object or non-stationary object in the captured image with a known region tracking process, without repeatedly specifying the stationary object or non-stationary object.

Figure 6:
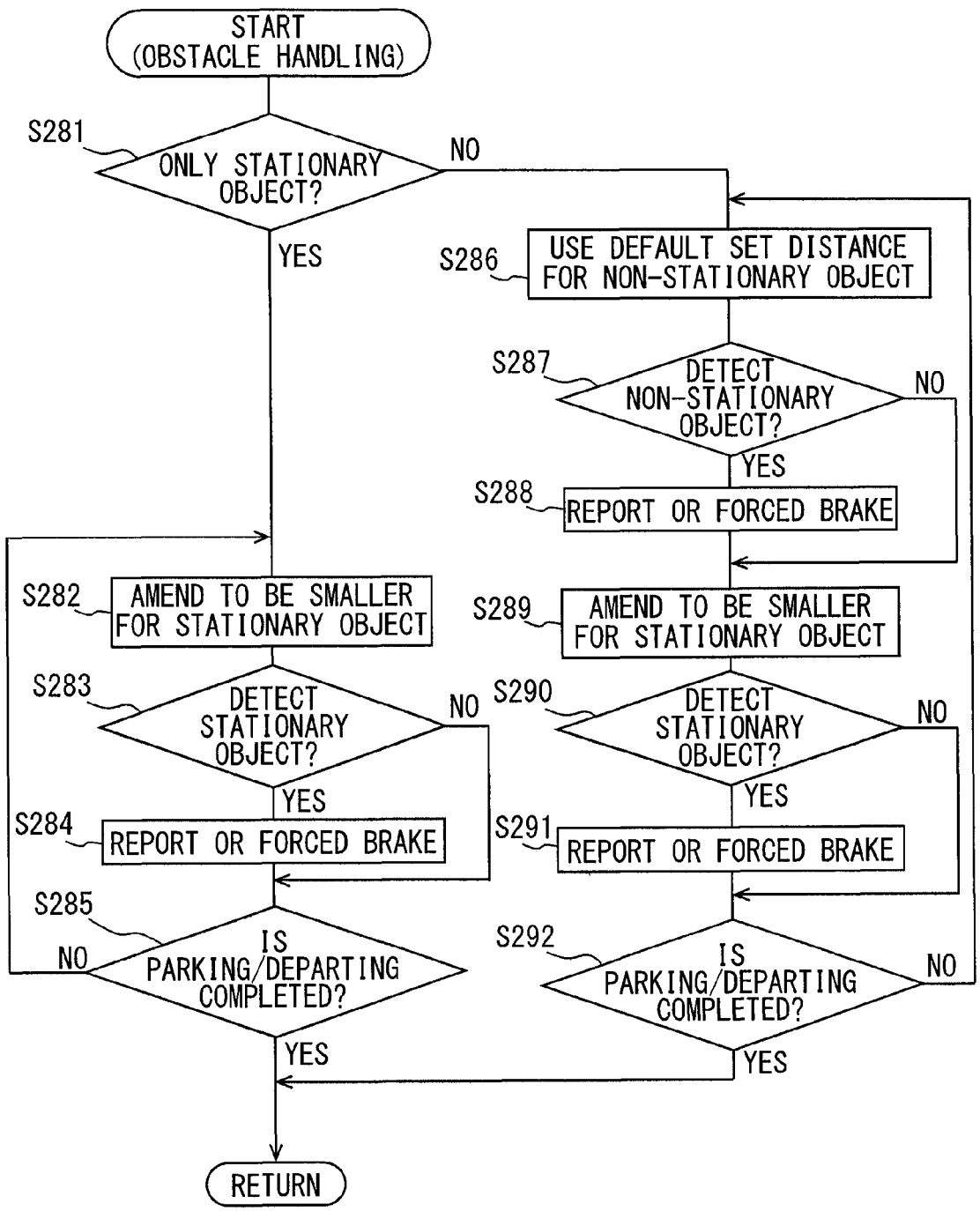
FIG. 6 is a flowchart illustrating an example of a sequence of an obstacle handling process according to the first embodiment.

At S28, an obstacle handling process is executed. The following explains an obstacle handling process with reference to a flowchart in FIG. 6.

First, at S281, when the obstacle(s) specified by the obstacle specification section 70 are each only a stationary object among a stationary object and a non-stationary object (S281: YES), the processing moves to S282. In contrast, when the obstacle(s) specified by the obstacle specification section 70 includes a non-stationary object (S281: NO), the processing moves to S286.

At S282, the proximity detection section 71 sets a stationary object set distance to be smaller than a default set distance; the stationary object set distance is a set distance for detecting a stationary object as a target obstacle targeted for a report or a vehicle behavior control. The stationary object set distance may be also referred to as a set distance.

The default set distance may be set to be used even in a parking region other than the target parking region for performing a report indicating a close approach to a target obstacle to a driver or a behavior control of the vehicle for avoiding contact of the vehicle to a target obstacle. In addition, the default set distance is set to be variable as needed, for instance, depending on the vehicle speed and set to have a great margin to the distance necessary for avoiding contact with an obstacle.

In setting the stationary object set distance to be smaller than the default set distance, the above-mentioned margin in the default set distance may be decreased significantly as long as the stationary object set distance is still longer than the distance necessary for avoiding contact with an obstacle.

At S283, the proximity detection section 71 detects a stationary object as a target obstacle when the distance between the vehicle and the stationary object successively detected by the obstacle specification section 70 is equal to or smaller than the stationary object set distance acquired at S282. The proximity detection section 71 may be also referred to as a control target detection section. When the proximity detection section 71 detects the stationary object specified by the obstacle specification section 70 as a target obstacle (S283: YES), the processing moves to S284. In contrast, when not detecting as a target obstacle (S283: NO), the processing moves to S285.

At S284, a report or a vehicle behavior control is performed. The report is for indicating a close approach to a target obstacle to a driver; the vehicle behavior control is for avoiding contact of the vehicle to a target obstacle. For instance, the report section 72 instructs the display apparatus 4 or the sound output apparatus 5 to perform a report indicating the presence of an obstacle. Further, the behavior regulation section 73 may instruct the brake ECU 7 to control the brake actuator 8 for performing forced braking such as decelerating or stopping the vehicle automatically. Furthermore, the behavior regulation section 73 may instruct the EPS_ECU 9 to operate the EPS actuator 10 for controlling automatically the steer angle to avoid a target obstacle. The report section 72 and the behavior regulation section 73 may be also referred to as an obstacle handling section.

At S285, the assistance determination section 68 determines whether the vehicle completes parking or departing. For instance, when the distance between the present position of the vehicle and the position of the target parking region becomes equal to or greater than the predetermined distance, the vehicle may be determined to have completed departing. When the shift position of the vehicle becomes the parking position, the vehicle may be determined to have completed parking. When parking or departing is determined to be completed (S285: YES), the processing moves to S29. In contrast, when parking or departing is not determined to be completed (S285: NO), the processing returns to S282 to repeat the process.

Further, at S286 after a non-stationary object is determined to be included in the obstacle(s) specified by the obstacle specification section 70, the proximity detection section 71 sets a non-stationary object set distance to be identical to the default set distance; the non-stationary object set distance is for detecting a non-stationary object as a target obstacle. The non-stationary object set distance may be also referred to as a first set distance.

At S287, the proximity detection section 71 detects a non-stationary object as a target obstacle when the distance between the vehicle and the non-stationary object successively detected by the obstacle specification section 70 is smaller than the non-stationary object set distance. When the proximity detection section 71 detects the non-stationary object specified by the obstacle specification section 70 as a target obstacle (S287: YES), the processing moves to S288. In contrast, when not detecting as a target obstacle (S287: NO), the processing moves to S289.

At S288, similarly to S284, a report or a vehicle behavior control is performed. The report is for indicating a close approach to a target obstacle to a driver; the vehicle behavior control is for avoiding contact of the vehicle to a target obstacle. The report or vehicle behavior control when a target obstacle is a stationary object may be different from the report or vehicle behavior control when a target obstacle is a non-stationary object.

At S289, similarly to S282, the proximity detection section 71 sets a stationary object set distance to be smaller than the default set distance; the stationary object set distance is for detecting a stationary object as a target obstacle.

Here, FIG. 7 is used to schematically illustrate examples of a detection range for detecting a stationary object as a target obstacle using a stationary object set distance and a detection range for detecting a non-stationary object as a target obstacle using a non-stationary object set distance. The broken lines in FIG. 7 illustrate detection ranges to detect a target obstacle.

The non-stationary object set distance for a non-stationary object uses the default set distance; the detection range for detecting a non-stationary object as a target obstacle becomes a detection range having a great margin to the distance necessary for avoiding contact with an obstacle. In contrast, the stationary object set distance for a stationary object has a margin significantly smaller than the margin of the default set distance; the detection range for detecting a stationary object as a target obstacle becomes smaller than that for detecting a non-stationary object as a target obstacle, as in FIG. 7. This disables a report or a vehicle behavior control for a stationary object unless the vehicle approaches closely the stationary object.

At S290, similarly to S283, when the proximity detection section 71 detects the stationary object specified by the obstacle specification section 70 as a target obstacle (S290: YES), the processing moves to S291. In contrast, when not detecting as a target obstacle (S290: NO), the processing moves to S292.

At S291, similarly to S284, a report or a vehicle behavior control is performed. The report is for indicating a close approach to a target obstacle to a driver; the vehicle behavior control is for avoiding contact of the vehicle to a target obstacle. At S292, similarly to S285, the assistance determination section 68 determines whether the vehicle completes parking or departing. When parking or departing is determined to be completed (S292: YES), the processing moves to S29. In contrast, when parking or departing is not determined to be completed (S292: NO), the processing returns to S286 to repeat the process.

Returning to FIG. 5, at S29, when it is determined that the time for terminating the parking or departing assistance process comes (S29: YES), the parking or departing assistance process is terminated. In addition, when it is not determined that the time for terminating the parking or departing assistance process comes (S29: NO), the processing returns to S21 to repeat the process. One example of the time for terminating the parking or departing assistance process is the ignition power source of the vehicle being turned into OFF state.

<Summary of First Embodiment>

Figure 8:
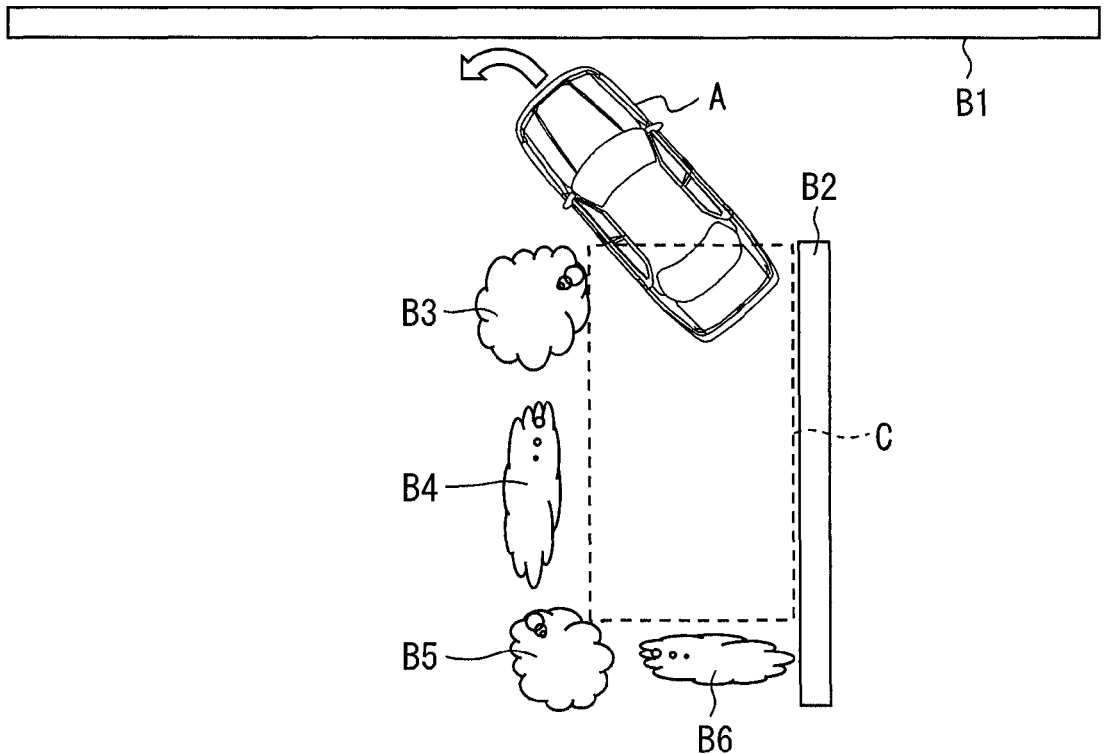
FIG. 8 is a schematic diagram illustrating an example in which any non-stationary object does not exist around a target parking region.
Figure 9:
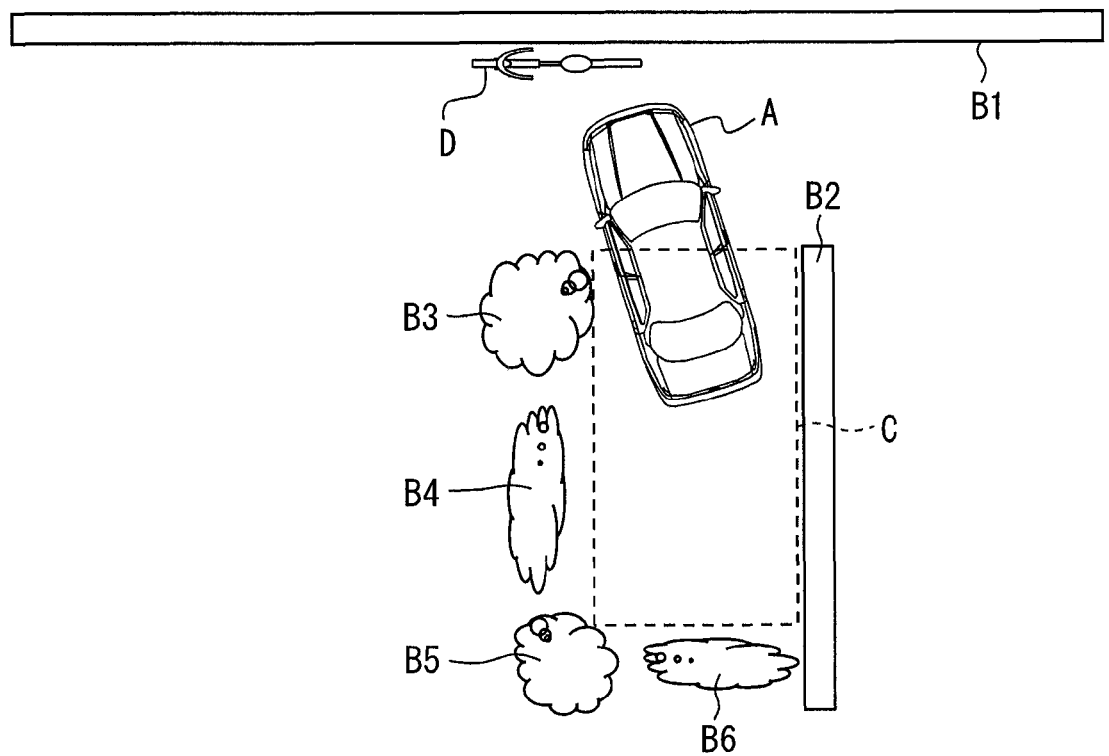
FIG. 9 is a schematic diagram illustrating an example in which a non-stationary object exists around same the target parking region as in FIG. 8.

The following explains effects of the first embodiment specifically using FIG. 8 and FIG. 9. FIG. 8 is a schematic diagram illustrating an example in which any non-stationary object does not exist around a target parking region; FIG. 9 is a schematic diagram illustrating an example in which a non-stationary object exists around same the target parking region as in FIG. 8. In FIG. 8 and FIG. 9, A illustrates a vehicle, B1 to B6 each illustrate a stationary object, and C illustrates a target parking region; in FIG. 9, D illustrates a non-stationary object.

Suppose that the stationary object B1, which the vehicle A needs to always approach on each parking or departing, is existing around the target parking region C, and the distance for detecting the stationary object B1 as a target obstacle has a great margin to the distance necessary for avoiding contact with an obstacle. In such cases, a report on the stationary object B1 or the behavior control such as forced braking of the vehicle A may be performed on each parking or departing. The driver may be accustomed to perform parking or departing in the target parking region C and able to perform each parking or departing without no contact between the vehicle A and the stationary object B1. Even in such cases, the report on the stationary object B1 or the behavior control of the vehicle A is performed on each parking or departing, causing the driver to feel troublesome.

In contrast, the first embodiment uses the distance having a significantly smaller margin as the stationary object set distance for detecting the stationary object B1 as a target obstacle; this can disable a report or behavior control unless the vehicle A approaches closely the stationary object B1.

Thus, even if there is existing around a parking region a stationary obstacle the vehicle needs to always approach closely on each parking or departing, the driver's troublesomeness due to a report or an automatic behavior control of the vehicle according to the presence of the obstacle can be decreased.

In addition, the first embodiment uses the distance having a significantly greater margin as a set distance for detecting the non-stationary object D, if present, as in FIG. 9. This can assist the vehicle A in parking or departing by performing earlier a report or a behavior control of the vehicle A against the non-stationary object D, which is not noticed by even a driver who is accustomed to parking or departing in the target parking region C.

First Modification Example

The above-mentioned embodiment sets a set distance for a non-stationary object, and a set distance for a stationary object, separately. There is no need to be limited thereto. For example, a set distance for a non-stationary object may be uniform to a set distance for a stationary object, which is referred to as a first modification example. The following explains the first modification example. To simplify the explanation of the present modification example or following modification examples, an element or component having the same function as that of the element or component explained in the foregoing embodiment is assigned with the same reference number as that in the foregoing embodiment and omitted from the following explanation.

The driving assistance system 100 of the first modification example is the same as the driving assistance system 100 of the first embodiment, except that an obstacle handling process in the parking or departing assistance process is partially different from the first embodiment.

<Obstacle Handling Process of First Modification Example>

Figure 10:
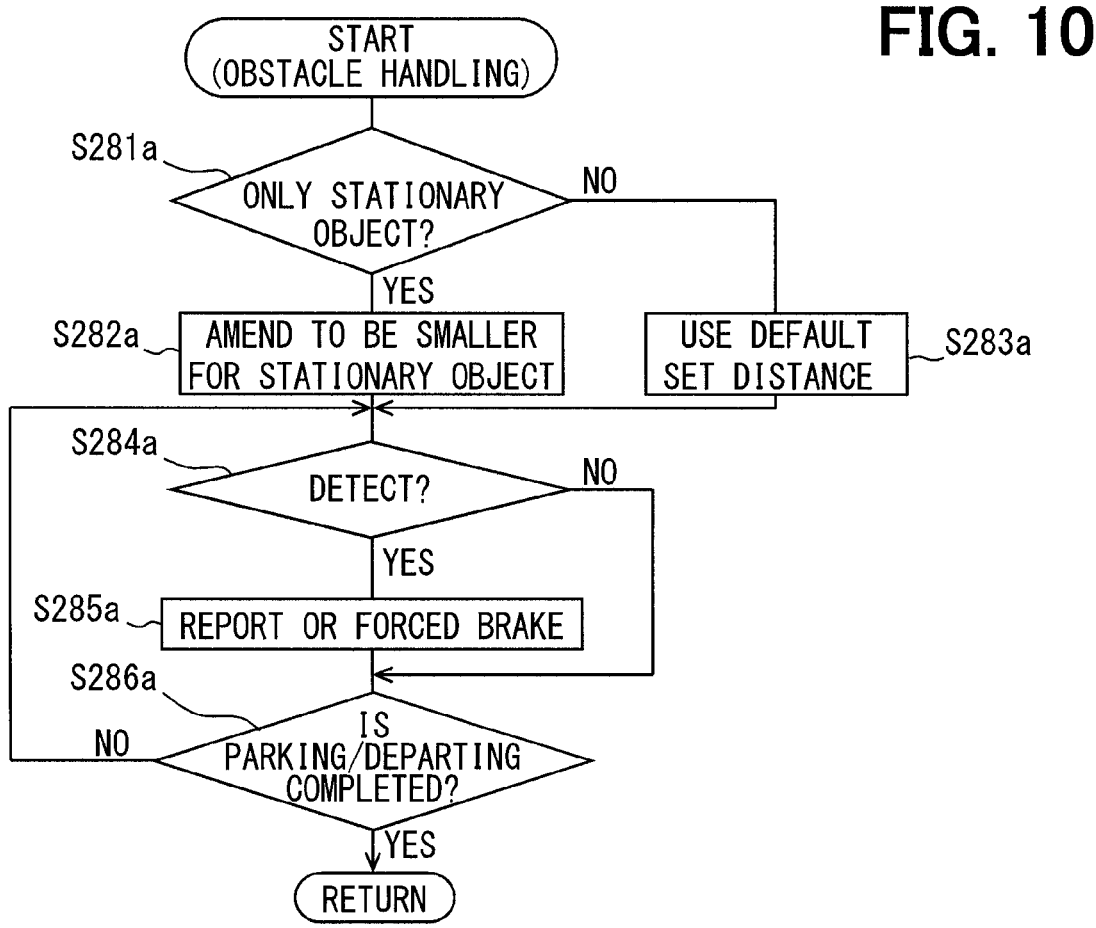
FIG. 10 is a flowchart illustrating an example of a sequence of an obstacle handling process according to a first modification example.

The obstacle handling process according to the first modification example will be explained using a flowchart in FIG. 10.

First, at S281a, similarly to S281, when the obstacle(s) specified by the obstacle specification section 70 are each only a stationary object (S281a: YES), the processing moves to S282a. In contrast, when a non-stationary object is included in the obstacle(s) specified by the obstacle specification section 70 (S281a: NO), the processing moves to S283a.

At S282a, the proximity detection section 71 sets a set distance to be smaller than a default set distance; the set distance is for detecting an obstacle as a target obstacle targeted for a report or vehicle behavior control. The default set distance may be identical to the default set distance in the first embodiment.

At S283a, the proximity detection section 71 maintains a set distance for detecting a target obstacle to be identical to the default set distance.

At S284a, the proximity detection section 71 detects a non-stationary object as a target obstacle when the distance between the vehicle and the non-stationary object or stationary object successively detected by the obstacle specification section 70 is smaller than the set distance. As explained above, when the obstacle(s) specified by the obstacle specification section 70 are each only a stationary object, the set distance is used as being smaller than the default set distance. When a non-stationary object is included in the obstacle(s), the default set distance is used.

When the proximity detection section 71 detects the non-stationary object or stationary object specified by the obstacle specification section 70 as a target obstacle (S284a: YES), the processing moves to S285a. In contrast, when not detecting as a target obstacle (S284a: NO), the processing moves to S286a.

At S285a, similarly to S284, a report or a vehicle behavior control is performed. The report is for indicating a close approach to a target obstacle to a driver; the vehicle behavior control is for avoiding contact of the vehicle to a target obstacle. The report or vehicle behavior control when a target obstacle is a stationary object may be different from the report or vehicle behavior control when a target obstacle is a non-stationary object.

At S286a, similarly to S285, the assistance determination section 68 determines whether the vehicle completes parking or departing. When parking or departing is determined to be completed (S286a: YES), the processing moves to S29. In contrast, when parking or departing is not determined to be completed (S286a: NO), the processing returns to S284a to repeat the process.

<Summary of First Modification Example>

The configuration of the first modification example uses a distance smaller than the default set distance as a set distance for detecting an obstacle targeted for a report or a vehicle behavior control when the object(s) existing around a target parking region are each only a stationary object without containing any non-stationary object. This can disable a report or a behavior control against a stationary object unless the vehicle approaches closely the stationary object.

Thus, even if there is existing around a parking region a stationary obstacle the vehicle needs to always approach closely on each parking or departing, the driver's troublesomeness due to a report or an automatic behavior control of the vehicle according to the presence of the obstacle can be decreased.

Second Modification Example

The above embodiment stores the captured image corresponding to the pattern according to the state of the vehicle depending on each of different target parking regions, in the arrangement memory 66, and reads out the past captured image corresponding to the target parking region and the pattern according to the state of the vehicle from the arrangement memory 66. There is no need to be limited thereto. The captured image corresponding to the pattern according to the state of the vehicle may be stored in the arrangement memory 66, depending on each of different target parking regions and each of different drivers, and the past captured image corresponding to (i) the driver, (ii) the target parking region, and (iii) the pattern according to the state of the vehicle may be read out from the arrangement memory 66, which may referred to as a second modification example. The following explains the second modification example.

The driving assistance system 100 according to the second modification example is identical to that in the first embodiment, except that (i) the driving assistance ECU 6 further includes a driver specification section 74 which specifies the driver and (ii) the obstacle learning process and the parking or departing assistance process are partially different from those in the first embodiment.

<Detailed Configuration of Driving Assistance ECU 6 According to Second Modification Example>

Figure 11:
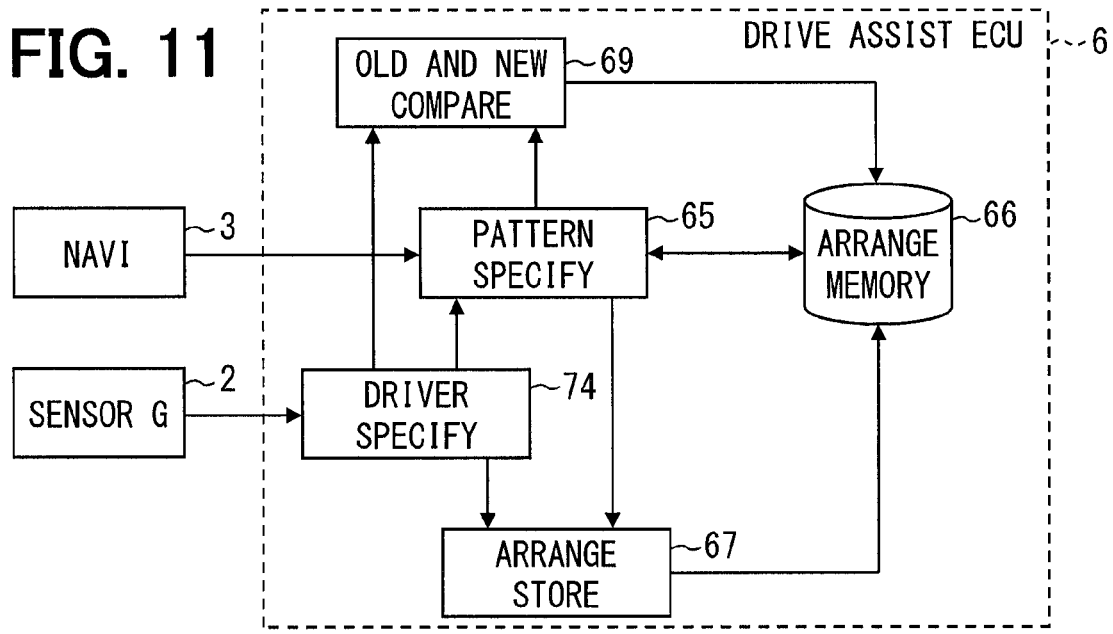
FIG. 11 is a block diagram for explaining a schematic configuration of a driving assistance ECU according to a second modification example.

The following will explain the driving assistance ECU 6 according to the second modification example using FIG. 11. FIG. 11 describes only functional blocks necessary for explaining the second modification example out of the functional blocks included in the driving assistance ECU 6, for convenience.

The driving assistance ECU 6 according to the second modification example includes the captured image acquisition section 61, the target parking region specification section 62, the parking region memory 63, the learning determination section 64, the pattern specification section 65, the arrangement memory 66, the arrangement storage section 67, the assistance determination section 68, the old and new comparison section 69, the obstacle specification section 70, the proximity detection section 71, the report section 72, the behavior regulation section 73, and the driver specification section 74.

The driver specification section 74 specifies a driver who is driving the vehicle. One example may use a weight scale or a pressure sensor which is provided in a seating portion of the driver seat, as the vehicle state sensor group 2, and specify a specific driver from the weight measured with the weight scale, or the detection value with the pressure sensor. Alternatively, an ID received from an electronic key may be used to specify a specific driver.

<Obstacle Learning Process in Second Modification Example>

In the obstacle learning process according to the second modification example, the pattern specification section 65 specifies a pattern according to the state of the vehicle and, in addition, the driver specification section 74 specifies a driver driving the vehicle, when the learning determination section 64 determines the start of parking or departing.

The arrangement storage portion 67 stores the captured image acquired by the image acquisition section 61 in the arrangement memory 66 to be associated with the pattern specified by the pattern specification section 65 and the driver specified by the driver specification section 74. Storing the captured image in the arrangement memory 66 is similar to the obstacle learning process in the first embodiment; thus, such storing is conducted when the arrangement storage section 67 determines that the captured image of the combination between the pattern specified by the pattern specification section 65 and the driver specified by the driver specification section 74 is needed to be updated or is not stored in the arrangement memory 66.

Storing the captured image in the arrangement memory 66 is conducted, as in FIGS. 12A and 12B, such that the combination of a specific driver (refer to X and Y) and a specific parking region (refer to C1 and C2) are associated with the patterns according to the states of the vehicle. The patterns according to the states of the vehicle in FIGS. 12A and 12B use the patterns of parking or departing directions of the vehicle with respect to the target parking region, for example.

An example, where the different target parking regions are assigned to respective drivers using the vehicle, as follows. The wife (Y in FIG. 12B) assigns the target parking region to the parking region of the wife's parents' home (C2 in FIG. 12B); in contrast, the husband (X in FIG. 12A) does not assign the target parking region to that of the wife's parents' home (C2 in FIG. 12B).

<Parking or Departing Assistance Process According to Second Modification Example>

In the parking or departing assistance process according to the second modification example, when the assistance determination section 68 determines that parking or departing is started, the driver specification section 74 additionally specifies the driver who is driving the vehicle while the pattern specification section 65 specifies the pattern according to the state of the vehicle.

(i) The target parking region in which parking or departing is determined to be started, (ii) the pattern specified by the pattern specification section 65, and (iii) the driver specified by the driver specification section 74 are combined; when the captured image under such combination is determined by the arrangement storage section 67 to be stored in the arrangement memory 66, the stored captured image is read as a past captured image. The past captured image and the present captured image acquired by the captured image acquisition section 61 are compared with each other by the old and new comparison section 69, detecting a difference between the captured images.

<Summary of Second Modification Example>

A single vehicle may be used by several drivers; a first driver may assign the target parking region to a subject parking region while a second driver may not assign the target parking region to the subject parking region. Even such situation may be handled by the second modification example. That is, since the past captured image of the target parking region according to a specific driver among the several drivers is stored, the set distance for detecting a stationary object targeted for a report or forced braking can be set to be smaller in the target parking region according to the specific driver.

The effects by the configuration of the second modification example will be explained by using the example, where the wife (Y in FIG. 12B) assigns the target parking region to the parking region of the wife's parents' home (C2 in FIG. 12B); in contrast, the husband (X in FIG. 12A) does not assign the target parking region to that of the wife's parents' home (C2 in FIG. 12B). In addition, similarly in the parking region C in FIG. 8, the wall is very close to the departing direction of the vehicle in the parking region C of the wife's parents' home; the vehicle needs to approach closely the wall on each departing. However, the wife Y, who is accustomed to departing from the parking region C, can depart without manipulating both forward movement and backward movement with a steering wheel turned. In contrast, the husband X, who is not accustomed to departing from the parking region C, cannot depart without manipulating both forward movement and backward movement with the steering wheel turned.

Under such situation, when the wife Y is the driver, the parking region C2 corresponds to the target parking region; the set distance for detecting a stationary object as a target for forced braking is set as being smaller. This can prevent the forced braking from working due to the presence of the wall even though the wife can depart from the parking region C2 without manipulating both forward movement and backward movement with the steering wheel turned. The wife Y can be prevented from feeling troublesome due to the forced braking.

In contrast, when the husband X is the driver, the parking region C2 does not correspond to the target parking region; the set distance for detecting not only a non-stationary obstacle but also a stationary object as a target for forced braking is not set as being smaller. This can allow the husband X to receive an assistance that activates the forced braking of the vehicle when approaching closely the wall; the husband X can depart from the parking region C2 without contact of the vehicle to the wall although the husband X is unfamiliar. Thus, the configuration of the second modification example can provide assistance necessary for a specific driver.

Third Modification Example

The above embodiment explains an example where the patterns according to the states of the vehicle use the patterns of parking or departing directions of the vehicle with respect to the target parking region. There is no need to be limited thereto. The patterns according to the states of the vehicle may be patterns of time zones or weather, which may be referred to as a third modification example.

The patterns of the time zones or weather may be patterned with daytime or night, or patterned with fair, cloudy, rainy, snowy, etc. Such patterns only need to be classified with differences which prevent a specific obstacle from being recognized as being identical on the captured images.

The third modification example can specify a non-stationary object from the present captured image and the past captured image that have the same condition in time zone or weather, eliminating the influence of the erroneous decision arising when the conditions such as time zone or weather are different. The non-stationary object may be specified with more sufficient accuracy.

Fourth Modification Example

In addition, the pattern according to the state of the vehicle may use the distance of the vehicle to the target parking region. The patterns of the distance of the vehicle to the target parking region may be several levels, which may be referred to as a fourth modification example.

The number of obstacles captured in the present captured image and the past captured image may differ due to the significant difference in the distance of the vehicle to the target parking region even if the number of the obstacles actually existing is the same in the present and the past. This lowers the accuracy of specifying a non-stationary object.

The fourth modification example can respond thereto. That is, a non-stationary object can be specified from the past and present captured images captured when the conditions in the distance of the vehicle to the target parking region are the same, eliminating the influence of the erroneous decision produced when the distances of the vehicle to the target parking region differ from each other significantly. The non-stationary object may be specified with more sufficient accuracy.

Fifth Modification Example

The above embodiment explains the configuration in which the set distance about a non-stationary object or the set distance in cases that a non-stationary object is existing is maintained to be identical to the default set distance; and the set distance about a stationary object or the set distance in cases that any non-stationary object is not existing (i.e., in cases that only stationary object(s) is existing) is varied to be smaller than the default set distance. There is no need to be limited thereto.

Another configuration may be provided as long as the following relation is satisfied. That is, the set distance about a non-stationary object or the set distance in cases that a non-stationary object is existing is maintained to be greater than the set distance about a stationary object or the set distance in cases that any non-stationary object is not existing. For instance, the set distance about a stationary object or the set distance in cases that any non-stationary object is not existing is maintained to be identical to the default set distance; in contrast, the set distance about a non-stationary object or the set distance in cases that a non-stationary object is existing is varied to be greater than the default set distance.

Sixth Modification Example

The above-mentioned embodiment explains using as the camera 1 both the front camera and the back camera. There is no need to be limited thereto. For example, only the front camera among the front camera and back cameras may be used as the camera 1, or only the back camera may be used.

For example, the configuration using only the front camera may apply to the case of exiting from the target parking region with forward movement or the case of entering into the target parking region with forward movement in the present disclosure; the configuration using only the back camera may apply to the case of exiting from the target parking region with backward movement or the case of entering into the target parking region with backward movement in the present disclosure.

Seventh Modification Example

The above embodiment explains the configuration in which the camera 1 has both the sensor for storing and comparing the arrangement of obstacle(s) and the sensor for detecting the distance to obstacles. There is no need to be limited thereto. For instance, another configuration may be provided which uses a sensor for storing and comparing the arrangement of obstacle(s) and a different sensor for detecting the distance to obstacles, which may be referred to as a seventh modification example. The following will explain the case where the camera 1 is used as the sensor for storing and comparing the arrangement of obstacle(s) while an ultrasonic sensor 11 is used as the different sensor for detecting the distance to obstacles, which may be referred to as a sixth modification example.

The driving assistance system 100a of the seventh modification example is the same as the driving assistance system 100 of the first embodiment, except that the ultrasonic sensor 11 is included and the parking or departing assistance process in the driving assistance ECU 6 is partially different from that of the first embodiment.

<Schematic Configuration of Driving Assistance System 100a>

Figure 13:
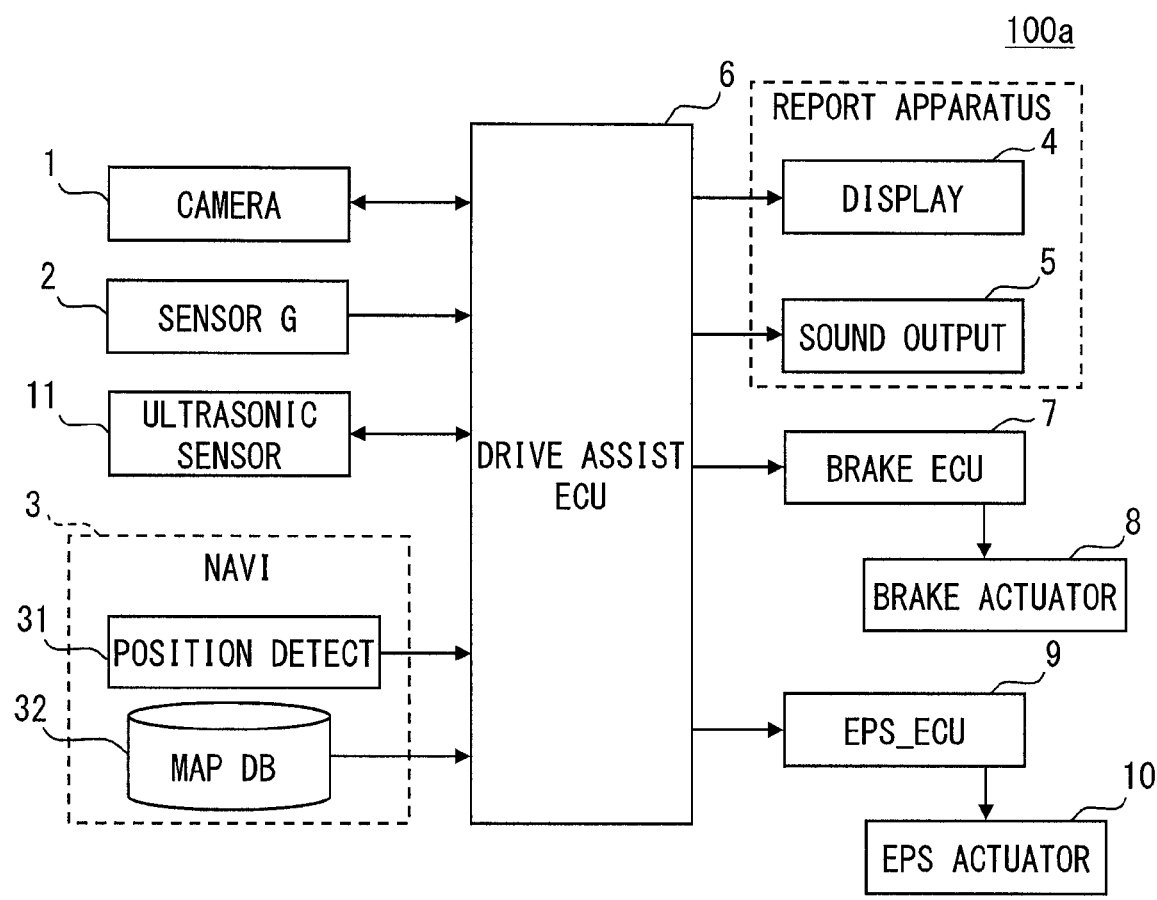
FIG. 13 is a block diagram illustrating an example of a schematic configuration of a driving assistance system according to a seventh modification example.

The driving assistance system 100a, which is mounted in a vehicle, includes a camera 1, a vehicle state sensor group 2, a navigation apparatus 3, a display apparatus 4, a sound output apparatus 5, a driving assistance ECU 6, a brake ECU 7, a brake actuator 8, an EPS_ECU 9, an EPS actuator 10, and an ultrasonic sensor 11, as in FIG. 13.

The ultrasonic sensor 11, which is installed in the vehicle, detects the distance to an obstacle around the vehicle. The ultrasonic sensor 11 may also be referred to as an obstacle sensor. The following will explain the case of using, as the ultrasonic sensor 11, a plurality of ultrasonic sensors 11 provided in front portions of the vehicle as having as a scanning region a predetermined angle region in front of the vehicle including front corner portions, and a plurality of ultrasonic sensors 11 provided in rear portions of the vehicle as having as a scanning region a predetermined angle region behind the vehicle including rear corner portions.

The configuration using the ultrasonic sensors 11 will be explained; alternatively, another configuration using a different sensor such as a radar other than the ultrasonic sensors may be provided as far as the different sensor detects the distance between the vehicle and an obstacle based on the delay time between the transmission and reception waves of the search waves.

In addition, the driving assistance ECU 6 of the seventh modification example may provide the configuration where the position of the obstacle relative to the vehicle is detected through triangular surveying from the distance between the vehicle and the obstacle detected by the plurality of ultrasonic sensors 11. Further, when the radar is used in place of the ultrasonic sensors 11, the radar may be of a phase mono-pulse system. That is, the position of the obstacle relative to the vehicle may be detected from the orientation of the obstacle relative to the vehicle which is found from the phase difference of the transmission and reception waves of the search waves, and the distance which is found from the delay time between the transmission and reception waves of the search waves.

<Parking or Departing Assistance Process According to Seventh Modification Example>

The parking or departing assistance process in the seventh modification example is the same as that in the first embodiment, except that the process that specifies a stationary object or non-stationary object around the target parking region is different.

The parking or departing assistance process in the seventh modification example specifies, as a non-stationary object, an object existing at the position of the difference detected at the processing similar to S26 of the first embodiment, and, as a stationary object, an object existing at a position other than the position of the difference. The position of the obstacle detected with the ultrasonic sensors 11 is associated with the position of the difference detected at the processing similar to S26 of the first embodiment (i.e., the position in the distance image), on the premise that both the positions are relative to the vehicle.

The obstacle specification section 70 of the seventh modification example detects successively the distance between the vehicle and a stationary object or non-stationary object, while executing the above-mentioned report related process.

<Summary of Seventh Modification Example>

The seventh modification example enables the driver to easily recognize the presence of a non-stationary obstacle, if present, around a parking region even if the host vehicle needs to be close to the non-stationary obstacle on each parking or departing, similarly to the first embodiment.

Eighth Modification Example

Another configuration may be provided where the camera 1 is replaced with a different sensor such as an ultrasonic sensor or radar that detects the position of the obstacle relative to the vehicle with transmission and reception waves of search waves, which may be referred to as an eighth modification example. The case using the different sensor such as an ultrasonic sensor or radar may use a configuration that uses the distribution in positions of obstacles detected with the different sensor for the arrangement of obstacle(s), instead of using the captured image.

The eighth modification example enables the driver to easily recognize the presence of a non-stationary obstacle, if present, around a parking region even if the host vehicle needs to be close to the non-stationary obstacle on each parking or departing, similarly to the first embodiment.

Ninth Modification Example

Another configuration may be provided which differentiates the sensor in a front portion of the vehicle and the sensor in a rear portion of the vehicle from each other such that the ultrasonic sensor 11 is used in the front portion and the camera 1 is used in the rear portion of the vehicle.

Tenth Modification Example

The above-mentioned embodiment indicates the configuration using the position detection unit 31 and the map DB 32 in the navigation apparatus 3. There is no need to be limited thereto. For example, another configuration may be provided which uses a position detection unit in a known locator or a map DB in a server without using the position detection unit 31 and the map DB 32 in the navigation apparatus 3.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance apparatus used in a vehicle, comprising:
   a control target detection section that detects as a target obstacle an obstacle that is existing within a set distance from the vehicle using an obstacle sensor detecting an obstacle around the vehicle;
   an obstacle handling section that performs at least either a report or an automatic behavior control of the vehicle when the control target detection section detects the target obstacle;
   an arrangement memory that stores a past obstacle arrangement around a parking region that serves as a target;
   an arrangement acquisition section that acquires a present obstacle arrangement around the parking region in a parking-region driving operation, the parking-region driving operation being at least either a driving operation to cause the vehicle to enter into the parking region or a driving operation to cause the vehicle to exit from the parking region; and
   an obstacle specification section that specifies a non-stationary obstacle that is an obstacle being not stationary around the parking region, based on a difference between the past obstacle arrangement stored in the arrangement memory and the present obstacle arrangement acquired by the arrangement acquisition section,
   wherein:
   the control target detection section assigns a non-stationary obstacle with a first set distance as the set distance;
   the control target detection section assigns a stationary obstacle with a second set distance as the set distance, the second set distance being smaller than the first set distance;

the control target detection section detects as the target obstacle a stationary obstacle when the stationary object is within the second set distance from the vehicle; and the control target detection section detects as the target obstacle a non-stationary obstacle when the non-stationary object is within the first set distance from the vehicle.

2. The driving assistance apparatus according to claim 1, wherein
the past obstacle arrangement stored in the arrangement memory and the present obstacle arrangement acquired by the arrangement acquisition section are acquired with the obstacle sensor used by the control target detection section.

3. The driving assistance apparatus according to claim 1, wherein
the past obstacle arrangement stored in the arrangement memory and the present obstacle arrangement acquired by the arrangement acquisition section are acquired with a different obstacle sensor that detects an obstacle existing around the vehicle, the different obstacle sensor being different from the obstacle sensor used by the control target detection section.

4. The driving assistance apparatus according to claim 2, wherein:
the obstacle sensor that acquires the past obstacle arrangement stored in the arrangement memory and the present obstacle arrangement acquired by the arrangement acquisition section is an imaging apparatus;
the arrangement memory stores an image of an area around the parking region captured using the imaging apparatus as the past obstacle arrangement around the parking region; and
the arrangement acquisition section acquires an image of an area around the parking region captured using the imaging apparatus in the parking-region driving operation as the present obstacle arrangement around the parking region.

5. The driving assistance apparatus according to claim 1, wherein:
the arrangement memory stores a plurality of the past obstacle arrangements according to patterns classified depending on states in the parking-region driving operations, respectively;
a pattern specification section is included to specify a pattern among the patterns depending on the states in the parking-region driving operation, respectively; and
the obstacle specification section specifies the non-stationary object around the parking region based on a difference between (i) the present obstacle arrangement acquired by the arrangement acquisition section and (ii) the past obstacle arrangement according to the pattern specified by the pattern specification section among the past obstacle arrangements stored in the arrangement memory.

6. The driving assistance apparatus according to claim 5, wherein
the pattern is at least one of a direction of the vehicle relative to the parking region, a distance of the vehicle to the parking region, a time zone, or a weather.

7. The driving assistance apparatus according to claim 1, wherein:
the arrangement memory stores a plurality of the past obstacle arrangements around the parking region, respectively, according to a plurality of drivers using the vehicle, if present;
a driver specification section is included to specify a driver who is driving the vehicle among the drivers; and
the obstacle specification section specifies the non-stationary object around the parking region based on a difference between (i) the present obstacle arrangement acquired by the arrangement acquisition section and (ii) the past obstacle arrangement according to the driver specified by the driver specification section among the past obstacle arrangements stored in the arrangement memory.

* * * * *